United States Patent [19]

Carlson

[11] Patent Number: 5,492,312
[45] Date of Patent: Feb. 20, 1996

[54] MULTI-DEGREE OF FREEDOM MAGNETORHEOLOGICAL DEVICES AND SYSTEM FOR USING SAME

[75] Inventor: J. David Carlson, Cary, N.C.

[73] Assignee: Lord Corporation, Erie, Pa.

[21] Appl. No.: 423,586

[22] Filed: Apr. 17, 1995

[51] Int. Cl.[6] .................................................. F16F 9/04
[52] U.S. Cl. ............... 267/140.14; 188/267; 267/140.15
[58] Field of Search ................... 188/267; 267/140.14, 267/140.15, 219; 248/562, 566, 636, 638

[56] References Cited

U.S. PATENT DOCUMENTS

| | | | |
|---|---|---|---|
| 4,595,166 | 6/1986 | Kurokawa | 248/559 |
| 4,793,599 | 12/1988 | Ishioka | 267/140.1 |
| 4,869,476 | 9/1989 | Shtarkman | 267/140.1 |
| 4,973,031 | 11/1990 | Takano et al. | 267/140.1 |
| 4,976,415 | 12/1990 | Murai et al. | 267/136 |
| 4,981,286 | 1/1991 | Kato et al. | 267/140.1 |
| 5,000,299 | 3/1991 | Goto et al. | 267/140.14 |
| 5,060,519 | 10/1991 | Chojitani et al. | 73/662 |
| 5,176,368 | 1/1993 | Shtarkman | 267/140.14 |
| 5,277,281 | 1/1994 | Carlson et al. | 188/267 |
| 5,284,330 | 2/1994 | Carlson et al. | 267/140.14 |
| 5,285,995 | 2/1994 | Gonzalez et al. | 248/550 |
| 5,305,981 | 4/1994 | Cunningham et al. | 248/550 |
| 5,344,129 | 9/1994 | Ide et al. | 267/140.14 |
| 5,366,048 | 11/1994 | Watanabe et al. | 188/267 |
| 5,368,132 | 11/1994 | Hollowell et al. | 187/393 |

FOREIGN PATENT DOCUMENTS

| | | | |
|---|---|---|---|
| 3001833 | 1/1988 | Japan | 267/140.14 |
| 5162524 | 6/1993 | Japan | 188/267 |
| 1248875 | 8/1986 | U.S.S.R. | 188/267 |
| 1249229 | 8/1986 | U.S.S.R. | 188/267 |

Primary Examiner—Robert J. Oberleitner
Assistant Examiner—Chris Schwartz
Attorney, Agent, or Firm—Richard K. Thomson; Randall S. Wayland; James W. Wright

[57] ABSTRACT

A semi-active device 20 is provided for damping motion between structures having multi-degrees of freedom. A magnetic field produced by a permanent magnet, a coil, or a combination thereof, change the rheological properties of an MR fluid 40 to effectively lock up the components and the structures to which they are attached to serve as a brake or damper of the associated compound motion. A system 21 employing the MR devices 20 includes a motion detection sensor 15 and a controller 19 to actuate the MR devices 20 when a predetermined motion threshold is exceeded.

10 Claims, 4 Drawing Sheets

Fig. 1

U.S. Patent  Feb. 20, 1996  Sheet 1 of 4  5,492,312
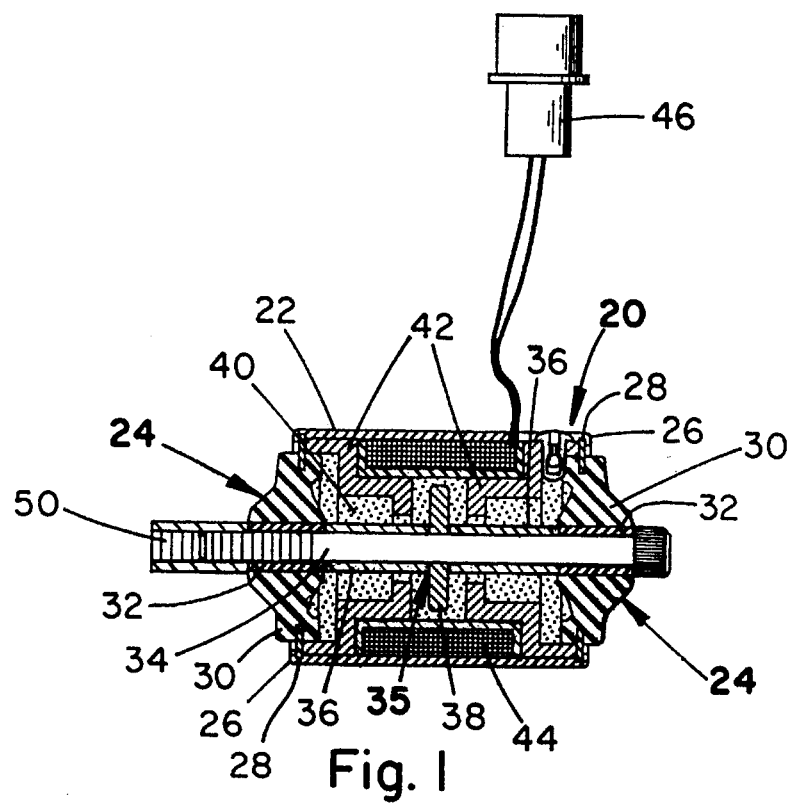
Fig. 1
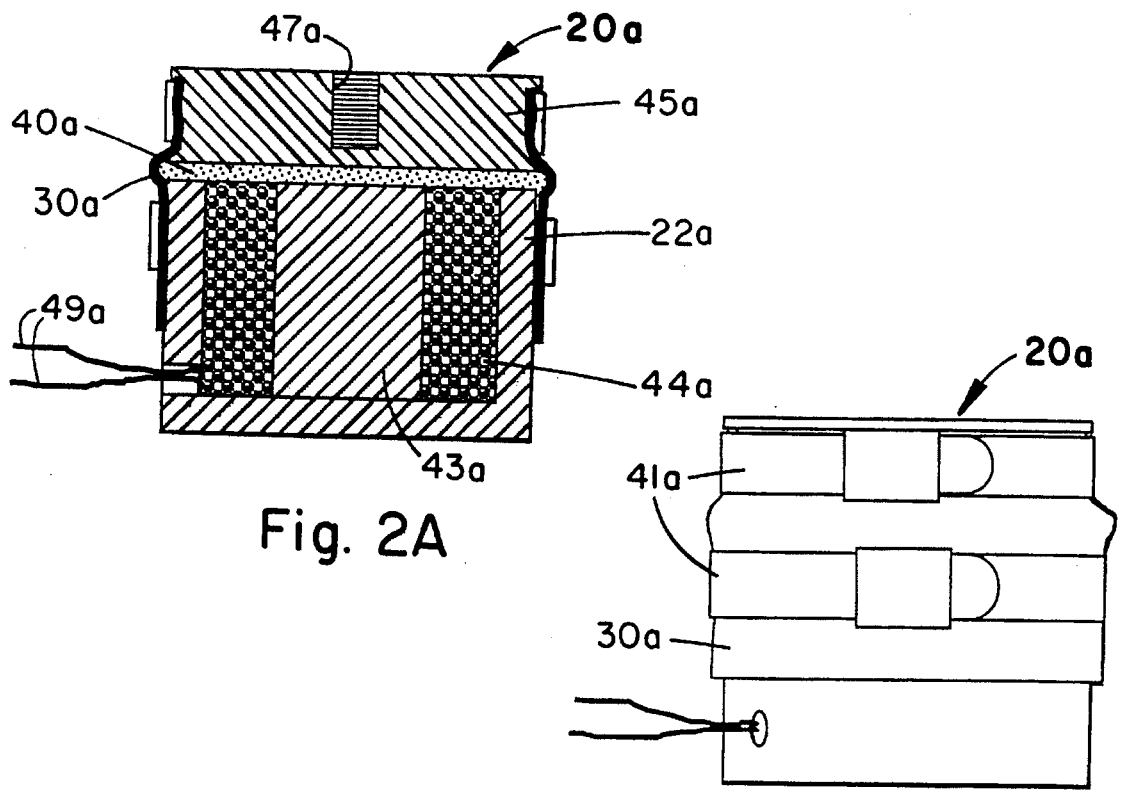
Fig. 2A
Fig. 2B

MULTI-DEGREE OF FREEDOM MAGNETORHEOLOGICAL DEVICES AND SYSTEM FOR USING SAME

BACKGROUND AND SUMMARY OF THE INVENTION

The present invention is directed to improvements in magnetorheological (MR) fluid devices. More particularly, this invention is directed to semi-active MR fluid devices which are capable of damping motion along/about two or more longitudinal or lateral axes. The devices of this invention can damp motion of a damper or a mount having six degrees of freedom.

Commonly owned U.S. Pat. Nos. 5,277,281 and 5,284,330 describe and claim improvements to dampers involving improved dimensional relationships and sealless damper designs, respectively. The present invention incorporates some of the features of each of those patents and hence each is hereby incorporated by reference. The sealless designs of the present invention are preferably designed to have the dimensional characteristics of the '281 patent while the sealless designs of '330 have been modified to enable damping of multi-degrees of freedom.

MR devices are increasingly being proposed for a variety of uses including dampers, mounts, and tunable vibration absorbers. A number of technical hurdles are preventing implementation of these devices in several of the potentially attractive applications. First, MR fluid is highly abrasive and in dampers where seals are utilized to wipe fluid from a piston rod and retain the fluid within the damper's housing, the fluid quickly finds its way between the seal and piston rod surface and causes rapid deterioration of the seal's integrity.

Another problem which has been encountered is the settling of the iron particles out of the fluid. The MR fluid no longer has the characteristics it was designed to have in that portion of the fluid having reduced particle density nor in that portion having increased particle density.

In addition, most damper designs are configured to combat motion in a single axial direction. Lateral movement or torsional movement has not been a design consideration and, hence, the typical damper is unable to cope with such motion.

The MR device of the present invention overcomes each of these deficiencies of the prior art. Each of the embodiments of the present invention is capable of damping motion in up to six degrees of freedom (three translational and three torsional). Further, in keeping with the development of the '330 patent, by employing a sealless design, one of the key technical hurdles facing implementation of an MR fluid device is overcome. Finally, by utilizing a fluid with a consistency of a gel, the settling problem is overcome. Since the actual stroke length need for these sealless designs is so short, a thicker fluid is actually better. The MR fluid for use in these devices is preferably a water-based or water-glycol based fluid having a) iron loading of at least 45% by weight; b) an off-state viscosity greater than 1 Pa-s; and/or c) an off-state yield strength of at least 50 Pa. Because of the gel-like consistency of this MR fluid, a less expensive, coarser grade of iron can be used.

Various other features, advantages and characteristics of the present invention will become apparent after a reading of the following application.

BRIEF DESCRIPTION OF THE DRAWINGS

The accompanying drawings, which form a part of the specification, illustrate several embodiments of the present invention. The drawings and description together, serve to fully explain the invention. In the drawings, FIG. 1 is a cross-sectional side view depicting a first preferred embodiment of the semi-active MR damper of the present invention;

FIG. 2a is a cross-sectional side view depicting a second preferred embodiment of the semi-active MR damper of the present invention;

FIG. 2b is a side view of the embodiment shown in FIG. 2a;

DETAILED DESCRIPTION OF THE PREFERRED EMBODIMENTS

Figure 3A:
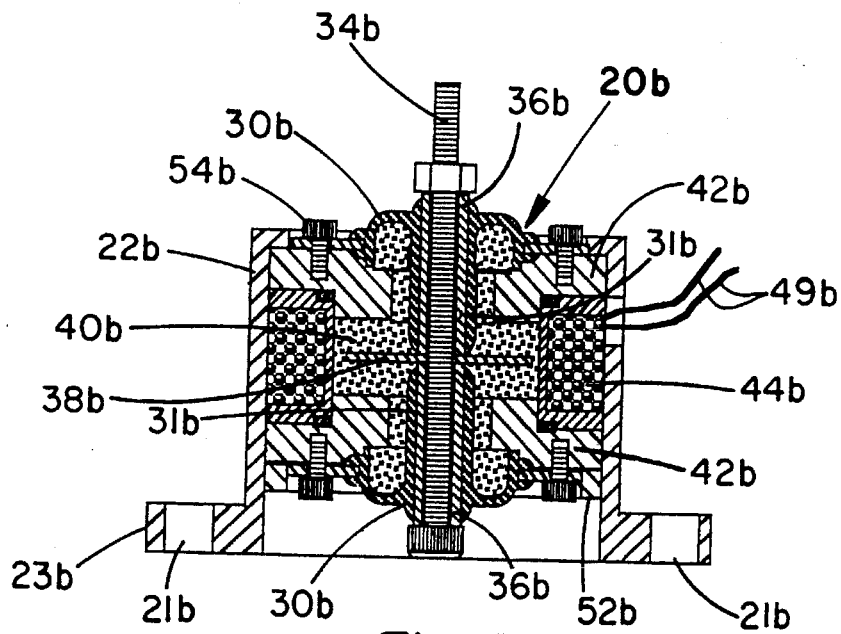
FIG. 3A is a cross-sectional side view showing a third embodiment.

A first preferred embodiment of the device of the present invention is shown in FIG. 1 generally at 20. MR damper 20 includes a generally cylindrical housing 22 which is preferably made of steel. It will be understood that while, for the most part, the terminology of "MR damper" is utilized throughout the specification, the MR devices described herein could also be configured as MR mounts or tuned vibration absorbers. Housing 22 is closed on each end by plateforms 24 which are captured by rolling over ends 26 of housing 22 to engage the metal plate 28 (preferably steel) of plateform 24. Plateform mounts are available from Lord Corporation and are available in a variety of sizes and stiffnesses. Plateforms which are particularly appropriate are identified as Lord Series 100 plateform mounts. Elastomer portions 30 of the plateforms 24 are bonded to metallic spacers 32 which surround opposite ends of through bolt 34. A pair of non-magnetic spacers 36 engage opposed sides of baffle plate 38 retaining it in position on bolt 34.

The bolt-and-baffle-plate assembly 35 functions as a piston moving in fluid 40. A pair of cup-shaped opposite facing members 42 make up the magnetic core receiving therebetween a bobbin wound coil 44. Core members 42 are preferably made of steel. An electrical connector 46 enables coil 44 to produce a magnetic field of a strength proportional to the magnitude of the current. A fill port used for supplying fluid 40 to the assembly is plugged by a pop-rivet 48 capable of sealing the opening. A threaded connector 50 is attached to the end of bolt 32 and extends beyond the end of the bolt providing means to attach the damper to various pieces of equipment requiring its use.

It is here noted that it is preferred that each of the embodiments of this invention be designed to conform to the configurational requirements set forth in commonly assigned U.S. Pat. No. 5,277,281, namely that the ratio of the cross-sectional area of the baffle plate 38 (in this case, the surface area of the plate) $A_{core}$ to the surface area of the magnetic pole (i.e., one end face of the cup-shaped members 42) $A_{pole}$, and the ratio of the path area (i.e., transverse cross-sectional area of housing 22) $A_{path}$ to $A_{pole}$, are each less than the ratio of the optimum magnetic flux density of the fluid $B_{opt}$ to the magnetic flux density at which the metal begins to saturate, $B_{knee}$.

When the coil is inactive, the fluid 40 can move past baffle plate as a result of movement by bolt 32 axially (longitudinally) in housing 22, laterally (side to side) or vertically within the housing or rotationally about any of these three orthogonal axes. When the coil 44 is activated, however, fluid 40 will become extremely viscous and effectively lock up the piston assembly 35 from moving relative to housing 22. The breakaway force needed to overcome this locking action will be proportional to the strength of the magnetic field and, hence, to the amount of current supplied to coil 44.

A second embodiment of the present invention is depicted in FIGS. 2A and 2B generally at 20a. This embodiment, although significantly different in appearance, operates utilizing substantially the same principles as the FIG. 1 embodiment. Housing member 22a houses coil 44a and a steel pole piece 43a. Cap member 45a, like housing 22a, is also made of steel. Threaded aperture 47a serves as means to connect cap member 45a to one of the two structures subject to vibration isolation. Associated housing 22a may be connected to the other of the two structures by any conventional means including banding, bolting through the base or by inclusion of an attachment flange or the like. Fluid 40a is contained between housing 22a and cap 45a by an elastomeric bladder 30a.

Bladder 30a is connected to housing 22a and to cap 45a by a pair of straps 41a and will permit axial movement, translational movement in two orthogonal directions, and limited rotational movement about any of these three axes. When coil 44a is powered by feeding current through wires 49a, the resultant magnetic field causes the MR fluid 40a to highly damp, or lock up relative movement between housing 22a and cap 45a and between the structures to which they are attached.

FIGS. 3A–3D depict embodiments three through six which are each similar the configuration of the first embodiment. In FIG. 3A, damper 20b is depicted as a mount. Baffle plate 38b is shown as having a lower profile and will, therefore, have less capacity to damp lateral deflections. Non-magnetic spacers 36b are depicted as extending through the elastomeric member 30b which have extension collars 31b which are bonded throughout their lengths to spacers 36b. Attachment bolt 34b is threaded throughout its length and is provided with a hex nut for securing it to one of the two structures with which the mount is to be associated. A large diameter ring nut 52b is threaded into the end of housing 22b to secure pole pieces 42b and coil 44b within housing 22b. While attachment bolts 54b have been shown here as a means of securing the upper plateform 24b to the assembly, rolling of the ends of housing 22b to overlie the edge of metal plate 28b remains the preferred capture technique. Further, ring nut 52b could be configured to partially overlie the edge of the opposite plateform 24b within housing 22b. Openings 21b in flange 23b afford the capability to bolt housing 22b to the second of the two structures for which isolation is sought.

Figure 3B:
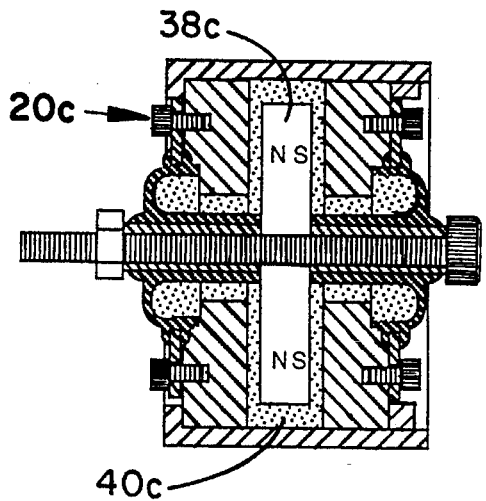
FIG. 3B is a cross-sectional side view of a fourth embodiment of the present invention.

FIG. 3B depicts a fourth embodiment which functions differently than its counterparts. In damper 20c the baffle plate/piston head 38c takes the form of a permanent magnet. Accordingly, the fluid 40c will offer the breakaway force associated with the magnetic field force induced by the permanent magnet and affords no capacity to vary the field strength nor the resistance or locking force. For some applications, this configuration may suffice offering a less costly implementation.

Figure 3C:
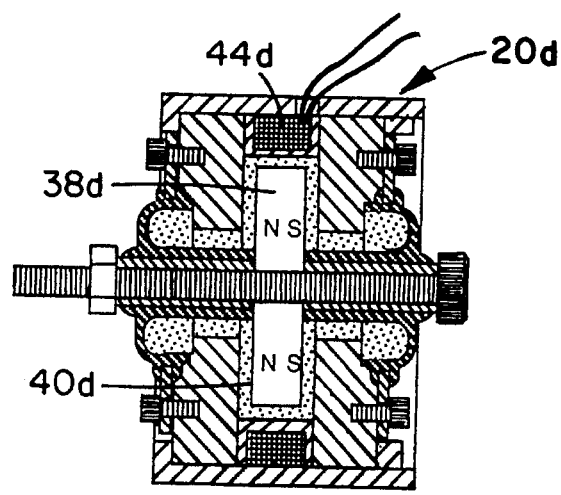
FIG. 3C is a cross-sectional side view of a fifth embodiment of the present invention.

FIG. 3C depicts a fifth embodiment offers a hybrid embodiment useful where the lack of field strength variability is unacceptable in which the baffle plate 38d is a permanent magnet to establish a base magnetic field and a coil 44d is also employed to increase (or decrease, depending upon the polarity of the electromagnet) the strength of the magnetic field acting upon the fluid 40d.

Figure 3D:
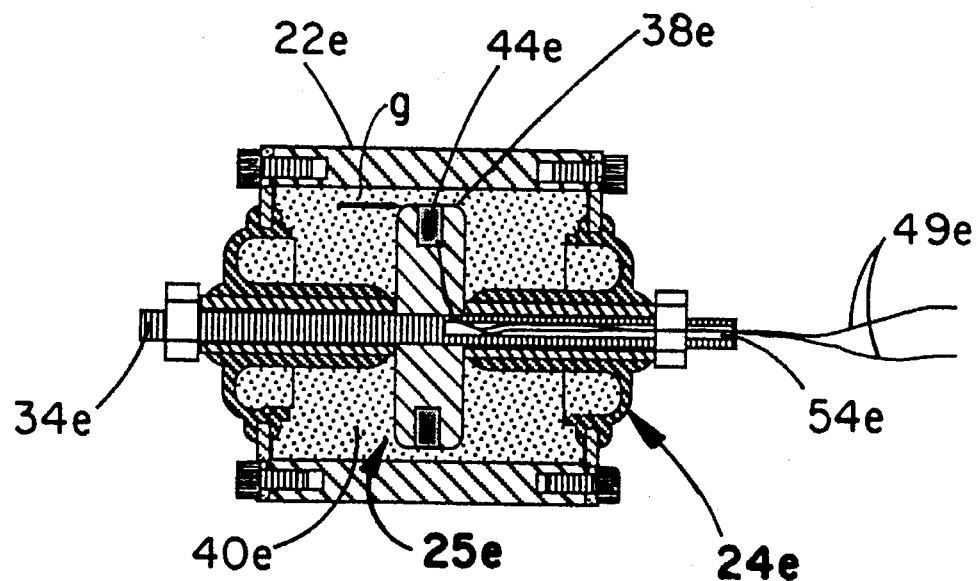
FIG. 3D is a cross-sectional side view of a sixth embodiment of the present invention.

FIG. 3D shows yet a sixth embodiment in which the baffle plate 38e becomes a spool with coil 44e wound thereon. Lead wires 49e are connected to coil 44e through an axial bore 54e in through bolt 34e. As with the previous embodiments, energization of coil 44e will alter the properties of the MR fluid increasing resistance of the fluid 40e to flow through the gap 'g' between the edges of baffle plate 38e and the wall of housing 22e. In fact, with the use of sufficient current, the piston assembly 25e will effectively be locked in place relative to housing 22e as has been mentioned with respect to earlier embodiments.

Figure 4A:
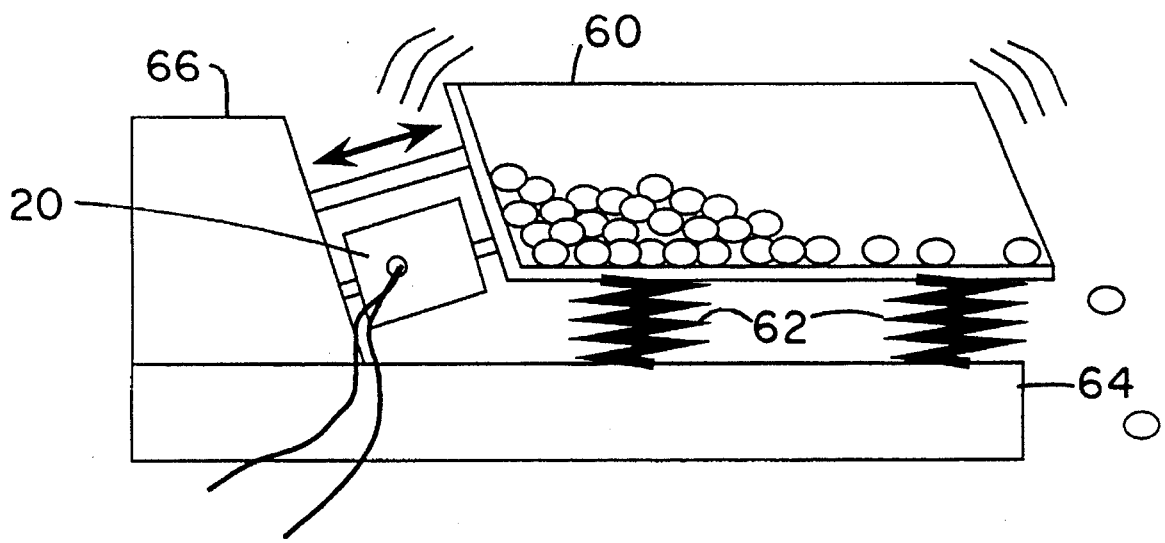
FIG. 4A is a schematic side view in partial section depicting a first application utilizing the system of the present invention.
Figure 4B:
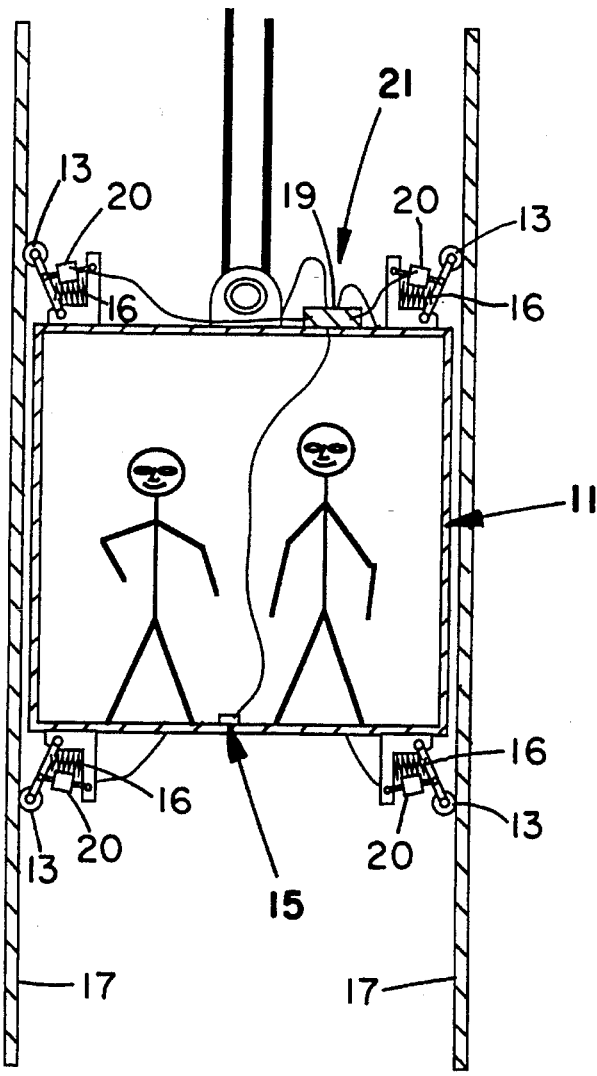
FIG. 4B is a schematic side view with portions broken away of a second application for the system of the present invention.
Figure 4C:
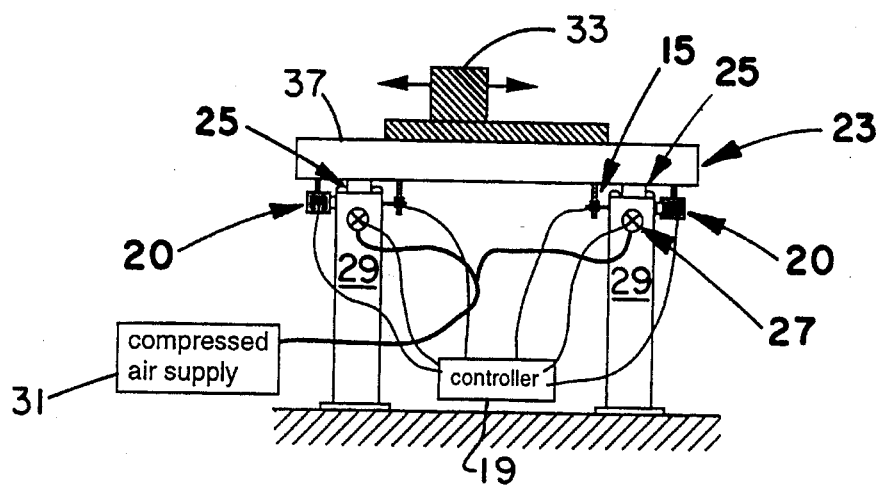
FIG. 4C is a schematic side view in partial section of a third application for the system of the present invention.

The MR devices 20 of the present invention have several attractive applications in a variety of systems, some of which are described in FIGS. 4A–4C. FIG. 4A depicts a MR damper 20 in accordance with the present invention being used in conjunction with a vibratory trough feeder which is equipped with a scale to measure out an appropriate weight of, for example, candy for packaging. Currently, vibratory tray 60 is suspended by what may be termed a lively suspension 62 above the scales 64 to facilitate vibration for product transfer into a package (not shown). While this suspension facilitates movement of the tray 60, it also can be counter productive in that it takes too long for the tray to settle down to produce an accurate reading on the scale. This not only slows down the packaging process, it can lead to inexact measurements of product resulting in packages which are outside the specified weight range.

The present invention enables the tray 60 to be locked in position during loading for weighing by activating the magnetic coil. When weighing is complete, the coil is deactivated and the vibrator 66 moves the product to the package. The coil 20 will once again be activated and the vibrator 66 inactivated responsive to a sensor which may be a zero reading from the scale 64.

FIG. 4B depicts another potential usage of the semi-active damper system of the present invention. An elevator car is equipped with as many as twelve (four shown) dampers 20 in system 21. Damper system further includes a sensor 15 (i.e., an accelerometer, or alternative velocity or displacement sensor) for detecting movement of elevator car 11. Normally, dampers 20 will be deactivated and guide rollers 13 will glide freely over rails 17 maintained in contact therewith by springs 16. However, when sensor 15 detects motion which falls outside a predetermined permissible range of motion, dampers 20 will be actuated by controller 19 to stabilize the car 11. Controller 19 contains the needed sensor electronics with the embedded algorithm to make the threshold activation determination, as well as the current supply for the dampers 20. While the rails are depicted as planar, they will actually, normally, be angle iron and, hence, the need for two additional sets of four dampers on the front and back of the car 11. The use of the semi-active system 21 of the present invention provides the needed stabilizing force to minimize sway of the passenger car 11 without unduly causing wear on guide rollers 13 by continuously forcing them against the rails 17 which would necessitate frequent replacement of rollers 13.

A third exemplary usage of the semi-active damper system of the present invention is shown in FIG. 4C generally at 21. An isolation table 23 utilizes air pillows 25 to support table 37 on legs 29. An air supply 31 (typically a compressor or bottled air tank) feeds compressed air to air mounts 25 through valves 27 so that sensitive optical instruments and the like, are isolated from the low frequency vibrations produced by HVAC and other sources traveling through the floor of a typical building. Adjustment of the equipment 33 on the table top 37 causes a destabilizing effect that can result in a swaying as the air supply attempts to counter the motion. By incorporating a semi-active system 21 including a damper 20 at each leg 29, a sensor 15 at each air mount 25 and a controller 19 to send electrical current to the respective dampers as needed responsive to the input of sensors 15, the position of the table top 37 can be frozen during equipment adjustment by locking up dampers 20 and then the dampers can be deactivated so the air table 23 resumes normal operation.

With regard to the particulars of the MR fluid useful in this system, utilizing a fluid with a consistency of a gel overcomes the settling problem associated with certain prior art fluids. Since the actual stroke length need for these sealless designs is so short, a thicker fluid is actually better. The MR fluid for use in these devices is preferably a water-based or water-glycol based fluid having iron loading of at least 45% by weight. In addition, the fluid preferably has an off-state viscosity greater than 1 Pascal-second (Pa-s) and/or an off-state yield strength of at least 50 Pa. Because of the gel-like consistency of this MR fluid, a less expensive, coarser grade of iron can be used.

The present invention describes a semi-active device 20 for damping motion between structures having multi-degrees of freedom. A magnetic field produced by a permanent magnet, a coil, or a combination thereof, change the rheological properties of an MR fluid 40 to effectively lock up the components and the structures to which they are attached to serve as a brake or damper of the associated compound motion. A system 21 employing the MR devices 20 includes a motion detection sensor 15 and a controller 19 to actuate the MR devices 20 when a predetermined motion threshold is exceeded.

Various changes, alternatives and modifications will become apparent following a reading of the foregoing specification. It is intended that all such changes, alternatives and modifications as come within the scope of the appended claims be considered part of the present invention.

What is claimed is:

1. A magnetorheological device for installation between two structures which have the capacity for relative movement which includes up to six degrees of freedom, said device comprising:

a) a first generally cylindrical metallic element having a first longitudinal axis and a first pair of orthogonal lateral axes, said first cylindrical element including means to secure said first cylindrical element to a first one of said two structures and;

a magnetic core element which has a first radially extending reaction surface positioned inwardly from said first generally cylindrical metallic element;

b) a second generally cylindrical metallic element having a longitudinal axis aligned with said first longitudinal axis and a pair of orthogonal lateral axes coincident, said second with said first or generally element including means to secure said second generally cylindrical, element to a second one of said two structures and;

a plate-shaped magnetic member having a second radially extending reaction surface opposing said first radially extending reaction surface;

c) an elastomeric member secured to each of said first and second generally cylindrical elements and permitting relative movement between said first and second generally cylindrical elements, said first and second generally cylindrical elements primary relative movement being translational movement along said longitudinal axes, said first and second generally cylindrical elements having secondary relative movement in at least one additional direction including translational movement along at least one of said two orthogonal axes and rotational movement about any one of three axes including said longitudinal axis and said two orthogonal lateral axes;

d) a fluid chamber at least partially defined by each of said first and second generally cylindrical elements and by said elastomeric member;

e) a volume of magnetorheological fluid contained within said fluid chamber;

f) a magnetic element for altering a property of said magnetorheological fluid so as to increase a resistance force to, and thereby damp, movement of said first generally cylindrical metallic element relative to said second generally cylindrical metallic element permitted by said elastomeric member;

whereby said relative movement between said two structures can be effectively damped, damping being most effective for said primary movement with a lesser degree of damping for said secondary movement.

2. The device of claim 1 wherein said plate-shaped member is a baffle plate.

3. The device of claim 2 wherein said second cylindrical element comprises a rod member coaxial with and extending longitudinally through said first cylindrical element and said baffle plate is affixed to said rod member.

4. The device of claim 3 wherein said baffle plate further comprises a third reaction surface for engaging said magnetorheological fluid, said third reaction surface opposing a fourth reaction surface formed by another magnetic core element.

5. The device of claim 4 wherein said first generally cylindrical element has a first end closed by said first plateform secured to a first end of said first cylindrical element as by crimping and said elastomeric member comprises an elastomer portion of said plateform bonded to said rod member.

6. The device of claim 5 wherein said first generally cylindrical element has a second end closed by said second plateform secured to a second end of said first cylindrical element as by crimping and said second plateform includes a second elastomer portion bonded to said rod member.

7. The device of claim 1 wherein said magnetorheological fluid is selected from the group consisting of water-based and water/glycol-based magnetorheological fluids.

8. The device of claim 7 wherein the magnetorheological fluid contains at least 45% iron by weight and has at least one of the properties selected from the group consisting of an off-state viscosity of at least 1000 mPa-s and an off-state yield strength greater than 50 Pa.

9. The device of claim 1 wherein said device is configured so that change of said magnetorheological fluid properties and said magnetic fields' relative strength, effectively damps said primary movement and each aspect of said secondary movement.

10. The device of claim 1 wherein said magnetic element comprises an electromagnet which can vary said resistance force between a minimum value and a maximum value.

* * * * *

UNITED STATES PATENT AND TRADEMARK OFFICE
CERTIFICATE OF CORRECTION

PATENT NO. : 5,492,312
DATED : February 20, 1996
INVENTOR(S) : J. David Carlson

It is certified that error appears in the above-indentified patent and that said Letters Patent is hereby corrected as shown below:

Col. 6, line 6, after "coincident", delete --,--.

Col. 6, line 7, before "said (first occurrence)", insert --with--; after "said (first occurrence)", insert --first pair, said--; delete --with said first or--; after "generally", insert --cylindrical--.

Signed and Sealed this

Nineteenth Day of November, 1996

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,492,312
DATED : February 20, 1996
INVENTOR(S) : J. David Carlson

It is certified that error appears in the above-indentified patent and that said Letters Patent is hereby corrected as shown below:

Col. 6, line 57, replace "said", with --a--.
Col. 6, line 58, replace "a", with --said--.
Col. 6, line 64, replace "said", with --a--.
Col. 6, line 65, replace "a", with --said--.

Signed and Sealed this

Tenth Day of June, 1997

Attest:

BRUCE LEHMAN

*Attesting Officer*  *Commissioner of Patents and Trademarks*